United States Patent
Hirai

(10) Patent No.: US 10,212,301 B2
(45) Date of Patent: *Feb. 19, 2019

(54) IMAGE FORMING APPARATUS, IMAGE FORMING METHOD, AND MEDIUM STORING A PROGRAM, WITH SELECTING BETWEEN PROCESS EXECUTABLE BY IMAGE FORMING APPARATUS AND PROCESS EXECUTABLE BY EXTERNAL DEVICE

(71) Applicant: CANON KABUSHIKI KAISHA, Tokyo (JP)

(72) Inventor: Nobuyuki Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,801

(22) Filed: Jan. 30, 2017

(65) Prior Publication Data

US 2017/0142282 A1 May 18, 2017

Related U.S. Application Data

(63) Continuation of application No. 14/799,866, filed on Jul. 15, 2015, now Pat. No. 9,588,727, which is a
(Continued)

(30) Foreign Application Priority Data

May 20, 2005 (JP) ................................ 2005-148556

(51) Int. Cl.
*H04N 1/00* (2006.01)
*G06F 3/12* (2006.01)
*H04N 1/32* (2006.01)

(52) U.S. Cl.
CPC ....... *H04N 1/00938* (2013.01); *G06F 3/1229* (2013.01); *G06F 3/1268* (2013.01);
(Continued)

(58) Field of Classification Search
None
See application file for complete search history.

(56) References Cited

U.S. PATENT DOCUMENTS 6,278,526 B1   8/2001 Kurozasa
6,278,528 B1 * 8/2001 Ohtsuka ............. H04N 1/00132
                                                           358/1.15
(Continued)

FOREIGN PATENT DOCUMENTS

JP     10-136131 A      5/1998
JP     2001-344162 A   12/2001
(Continued)

OTHER PUBLICATIONS

Aug. 8, 2006 International Search Report and Written Opinion in International Patent Appln. No. PCT/ JP2006/309434.
(Continued)

*Primary Examiner* — Hilina K Demeter
(74) *Attorney, Agent, or Firm* — Venable LLP

(57) ABSTRACT

A PC registers in advance PC-assistant copying functions which can be provided by the printer driver for a MFP. The MFP presents, to the user, copying functions including the registered functions. Upon reception of a copy instruction, the MFP determines whether selected functions include a PC-assisted copying function. If the selected functions include a PC-assisted copying function, the MFP transmits, to the PC, scanned image data and a job ticket containing information representing the selected functions. Upon recep-
(Continued)

tion of the job ticket, the PC generates a print job for printing the image data on the basis of the job ticket, and transmits the print job to the MFP.

15 Claims, 23 Drawing Sheets

Related U.S. Application Data continuation of application No. 11/913,907, filed as application No. PCT/JP2006/309434 on May 1, 2006, now Pat. No. 9,124,731.

(52) U.S. Cl.
CPC ....... *G06F 3/1285* (2013.01); *H04N 1/00204* (2013.01); *H04N 1/32101* (2013.01); *H04N 1/32507* (2013.01); *H04N 2201/001* (2013.01); *H04N 2201/0039* (2013.01); *H04N 2201/0075* (2013.01); *H04N 2201/0094* (2013.01); *H04N 2201/3205* (2013.01); *H04N 2201/3208* (2013.01); *H04N 2201/3212* (2013.01); *H04N 2201/3218* (2013.01); *H04N 2201/3242* (2013.01); *H04N 2201/3274* (2013.01); *H04N 2201/3278* (2013.01)

(56) References Cited

U.S. PATENT DOCUMENTS

| | | | |
|---|---|---|---|
| 6,842,263 B1 | 1/2005 | Saeki | |
| 6,860,657 B2 | 3/2005 | Katamoto et al. | |
| 7,019,857 B2 | 3/2006 | Abe | |
| 7,075,670 B1* | 7/2006 | Koga | G06F 3/1204 358/1.15 |
| 7,224,821 B2 | 5/2007 | Furukawa et al. | |
| 7,292,359 B2 | 11/2007 | Takamiya | |
| 7,375,835 B1 | 5/2008 | Hull et al. | |
| 7,423,773 B2 | 9/2008 | Saeki | |
| 7,636,757 B2* | 12/2009 | Kemp | G06F 3/1228 358/1.15 |
| 7,639,380 B2* | 12/2009 | Takemoto | G03D 15/005 358/1.15 |
| 7,948,643 B2 | 5/2011 | Aritomi | |
| 8,004,701 B2 | 8/2011 | Ueda et al. | |
| 8,072,639 B2 | 12/2011 | Saeki | |
| 9,124,731 B2 | 9/2015 | Hirai | |
| 9,588,727 B2 | 3/2017 | Hirai | |
| 2002/0044298 A1* | 4/2002 | Kaneko | H04N 1/32128 358/1.15 |
| 2003/0063313 A1* | 4/2003 | Ito | G06F 3/1253 358/1.15 |
| 2003/0164972 A1* | 9/2003 | Yoshioka | H04N 1/00204 358/1.13 |
| 2003/0179402 A1 | 9/2003 | Sandfort et al. | |
| 2003/0233443 A1 | 12/2003 | Hirai et al. | |
| 2004/0034862 A1 | 2/2004 | Kadota | |
| 2004/0100651 A1 | 5/2004 | Leone, III et al. | |
| 2004/0174560 A1* | 9/2004 | Shima | G06F 3/1206 358/1.15 |
| 2005/0012951 A1 | 1/2005 | Madril, Jr. et al. | |
| 2005/0134914 A1 | 6/2005 | Fukuda et al. | |
| 2005/0146731 A1 | 7/2005 | Mitani | |
| 2005/0219556 A1 | 10/2005 | Lee et al. | |
| 2006/0077415 A1 | 4/2006 | Bhattacharjya et al. | |
| 2006/0221367 A1 | 10/2006 | Shiokawa | |
| 2006/0232811 A1 | 10/2006 | Yokoyama | |
| 2006/0282782 A1 | 12/2006 | Yamada | |
| 2007/0109561 A1 | 5/2007 | Suzue | |
| 2007/0273915 A1 | 11/2007 | Nakagawa | |
| 2008/0013129 A1 | 1/2008 | Sato | |
| 2008/0055634 A1 | 3/2008 | Miyahara | |
| 2008/0170259 A1 | 7/2008 | Koshika et al. | |
| 2008/0204807 A1 | 8/2008 | Nakatsuka | |
| 2010/0079823 A1 | 4/2010 | Miyazawa et al. | |
| 2010/0259799 A1 | 10/2010 | Shibao | |

FOREIGN PATENT DOCUMENTS

| | | |
|---|---|---|
| JP | 2001-345974 A | 12/2001 |
| JP | 2004-282379 A | 10/2004 |
| JP | 2005-184379 A | 7/2005 |

OTHER PUBLICATIONS

May 14, 2007 International Preliminary Report on Patentability in International Patent Appln. No. PCT/JP2006/309434.

* cited by examiner

FIG. 3

| REGISTRATION OF PC-ASSISTED COPYING FUNCTION |
|---|

301 — PRINTER DRIVER TO BE REGISTERED : [C1000 Printer ▼]

302 — AVAILABLE PRINTER DRIVER FUNCTIONS
2 in 1 / 4 in 1 / 8 in 1 / 9 in 1 / 16 in 1 /
POSTER (2×2)/(3×3)/(4×4)
COPY-FORGERY-INHIBITED PATTERN PRINTING

[REGISTER] — 303

F I G. 4A
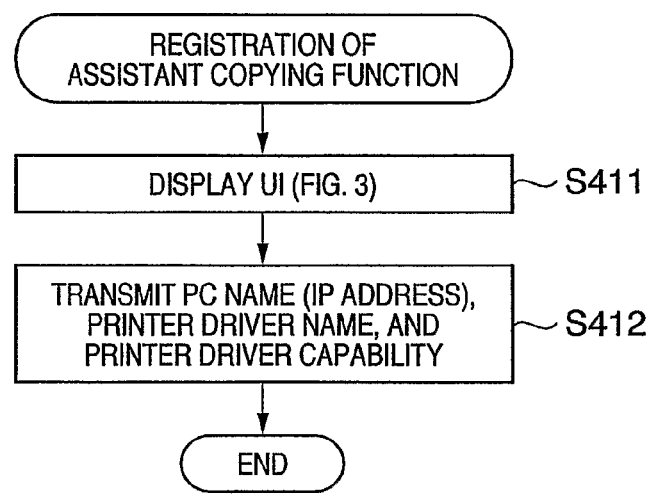

FIG. 6

REDUCTION LAYOUT

```
ENLARGEMENT/REDUCTION LAYOUT 2 in 1                      POSTER (2×2) (PC-ASSISTED)
    4 in 1                      POSTER (3×3) (PC-ASSISTED)
    8 in 1                      POSTER (4×4) (PC-ASSISTED)
  × 9 in 1 (PC-ASSISTED)
   16 in 1 (PC-ASSISTED)
```

FIG. 8

EXTENDED FUNCTION (PC-ASSISTED)

☐ COPY-FORGERY-INHIBITED PATTERN PRINTING

FIG. 11

| REGISTRATION OF PC-ASSISTED COPYING FUNCTION |
|---|

1101 — PRINTER DRIVER TO BE REGISTERED : [ C1000 Printer ▼ ]

1102 — AVAILABLE PRINTER DRIVER FUNCTIONS
2 in 1 / 4 in 1 / 8 in 1 / 9 in 1 / 16 in 1 /
POSTER (2×2)/(3×3)/(4×4)
COPY-FORGERY-INHIBITED PATTERN PRINTING

1103 — SCANNER DRIVER TO BE REGISTERED : [ C1000 Scanner ▼ ]

1104 — AVAILABLE SCANNER DRIVER FUNCTIONS
DUST/SCRATCH REDUCTION
FADING CORRECTION
MOIRÉ REDUCTION

[ REGISTER ] — 1105

FIG. 13

EXTENDED FUNCTION (PC-ASSISTED)

☐ COPY-FORGERY-INHIBITED PATTERN PRINTING
☐ DUST/SCRATCH REDUCTION
☐ FADING CORRECTION
☐ MOIRÉ REDUCTION

FIG. 16A

1601 — PRINTER DRIVER TO BE REGISTERED : [ C1000 Printer ▼ ]

1602 — AVAILABLE PRINTER DRIVER FUNCTIONS
2 in 1 / 4 in 1 / 8 in 1 / 9 in 1 / 16 in 1 /
POSTER (2×2)/(3×3)/(4×4)
COPY-FORGERY-INHIBITED PATTERN PRINTING

1603 — SCANNER DRIVER TO BE REGISTERED : [ C1000 Scanner ▼ ]

1604 — AVAILABLE SCANNER DRIVER FUNCTIONS
DUST/SCRATCH REDUCTION
FADING CORRECTION
MOIRÉ REDUCTION

1606 — NAME TO BE REGISTERED : [ C1000 – PC A ]

[ REGISTER ] — 1605

REGISTRATION OF PC-ASSISTED COPYING FUNCTION

FIG. 17

PC-ASSISTED COPYING: SELECT DRIVER.

✕ C1000 – PC A
   C1000 – PC B (Printer Driver A)
   C1000 – PC B (Printer Driver B)
   C1000 – PC C
   C1000 – PC D

IMAGE FORMING APPARATUS, IMAGE FORMING METHOD, AND MEDIUM STORING A PROGRAM, WITH SELECTING BETWEEN PROCESS EXECUTABLE BY IMAGE FORMING APPARATUS AND PROCESS EXECUTABLE BY EXTERNAL DEVICE

This application is a continuation of application Ser. No. 14/799,866, filed Jul. 15, 2015, which is a continuation of application Ser. No. 11/913,907 filed Nov. 8, 2007, U.S. Pat. No. 9,124,731 B2, which was the National Stage of International Application No. PCT/JP2006/309434 filed May 1, 2006.

TECHNICAL FIELD

The present invention relates to a copying apparatus, copying system, and control method thereof and, more particularly, to a copying apparatus and copying system which can cause a copying machine or the like connected to a computer to perform a copying process using a function provided by the computer, a control method thereof, and a control program thereof.

BACKGROUND ART

Recently, the scanner and printer units of a digital copying machine can be used as a single-function scanner and single-function printer. In order to utilize the scanner and printer units of the copying machine, a scanner driver and printer driver as programs to allow a computer to use a printer and scanner must be installed in the computer. The printer driver and scanner driver have achieved advanced functions.

Many of functions provided by the advanced scanner driver and printer driver cannot be implemented when a single copying machine performs copying. For example, an Nin1 function of, e.g., "9 pages/sheet" (function of laying out images of nine pages on one print sheet) is provided by the printer driver, but is not supported by a current single copying machine. To use a function which is provided by the printer driver or scanner driver but not by the copying machine, an original document is scanned using the scanner function of the copying machine, and the image data is input to the computer. In the computer, print settings are made using the printer driver in order to print the input image data, and then, the image is printed using the printer. The user must execute this cumbersome operation.

There is also proposed a copying application which implements scanning and printing of an original document by a simple operation on a personal computer (PC) using a preset scanner driver and printer driver (see, e.g., Japanese Patent Laid-Open No. 2001-345974 (pp. 8-9, FIGS. 3 and 4)).

In the above-described prior art, however, various copy settings for copying by a copying application must be made on the PC. For example, when a copying machine is connected to a network and located at a place distant from a PC, the user must go to the copying machine, set an original document there, come back to the PC, execute scanning and printing, then go back to the image processing apparatus, and bring back the original document and its copy. If the user does not know well how to make settings in the copying application, he cannot perform copying using the personal computer. Even if the user can perform copying, he must do a setting operation on the computer for copying, decreasing the copying efficiency.

DISCLOSURE OF INVENTION

The present invention has been made in consideration of the above situation, and has as its object to provide a copying apparatus and copying system capable of utilizing, by a simple operation, image copying using a function provided by a computer or a function of a copying machine that is provided only for use by the computer, a control method thereof, and a control program thereof.

In order to achieve the above object, the present invention comprises the following arrangement.

A copying apparatus which has an image scanner unit and a printer unit and can be connected to an information processing apparatus comprises save means for saving extended function information representing an extended printer function which can be set in the information processing apparatus when the printer unit is used as a printer connected to the information processing apparatus, function presentation means for outputting, as copying functions which can be provided by the copying apparatus, a local function which can be independently provided by the copying apparatus and an extended printer function represented by the extended function information, so as to allow a user to set a function, and control means for, when copying functions set by the user include the extended printer function, transmitting, to the connected information processing apparatus, image data read by the image scanner unit and function setting information representing the set extended printer function, and when a print instruction containing the image data and print setting information corresponding to the function setting information is received from the information processing apparatus, causing the printer unit to print the image data in accordance with the print setting information.

An information processing apparatus which can communicate with a copying apparatus having a printer unit that can be used as an independent peripheral device, and has a printer driver for the peripheral device comprises recognition means for recognizing reception of image data and extended function information representing a copy setting from the copying apparatus, setting means for, upon reception of the extended function information, setting print setting information in the printer driver in accordance with the copy setting represented by the extended function information, and print instruction generation means for generating a print instruction complying with the print setting information by using the image data as data to be printed, and transmitting the generated print instruction to the copying apparatus.

When the printer unit is used as a printer connected to the information processing apparatus, the copying apparatus according to the present invention saves extended function information representing an extended printer function which can be set in the information processing apparatus. The copying apparatus outputs, as copying functions which can be provided by the copying apparatus, a local function which can be independently provided by the copying apparatus and an extended printer function represented by the extended function information, so as to allow the user to set a function. When copying functions set by the user include the extended printer function, the copying apparatus transmits, to the information processing apparatus connected to the copying apparatus, image data read by the image scanner unit and function setting information representing the set extended printer function. When the copying apparatus receives, from the information processing apparatus, a print instruction containing the image data and print setting information corresponding to the function setting information, the printer unit prints the image data in accordance with the print setting information. As a result, image copying using a function provided by the information processing apparatus or a function of the copying apparatus that is provided only for use by the information processing apparatus can be utilized by a simple operation.

The information processing apparatus according to the present invention monitors reception of image data and extended function information representing a copy setting from the connected copying apparatus. Upon reception of the extended function information, the information processing apparatus sets print setting information in accordance with the copy setting represented by the extended function information. The information processing apparatus generates a print instruction complying with the print setting information by using the image data as data to be printed, and transmits the generated print instruction to the copying apparatus. Accordingly, a function provided by the information processing apparatus or a function of the copying apparatus that is provided only for use by the information processing apparatus can be provided for a copying operation in the copying apparatus.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view showing an example of a PC-assisted copying function registration dialog in the information processing terminal 20 according to the first embodiment;

FIGS. 4A and 4B are flowcharts showing a PC-assisted copying function registration process in the image processing apparatus 10 according to the first embodiment;

FIG. 6 shows an example of a copying function display window when a registered PC is neither connected nor activated in the image processing apparatus 10 according to the first embodiment;

FIG. 7 shows an example of a copying function display window when a registered PC is connected and activated in the image processing apparatus 10 according to the first embodiment;

FIG. 8 shows an example of another copying function display window when a registered PC is connected and activated in the image processing apparatus 10 according to the first embodiment;

FIG. 11 is a view showing an example of a registration dialog for a PC-assisted copying function in an information processing terminal 20 according to the second embodiment of the present invention;

FIG. 13 shows an example of a copying function display window when a registered PC is connected and activated in the image processing apparatus 10 according to the second embodiment;

FIG. 16A is a view showing an example of a PC-assisted copying function registration dialog in an information processing terminal 20 according to the third embodiment of the present invention;

FIG. 17 shows a PC-assisted copying function selection window in an image processing apparatus 10 according to the third embodiment;

BEST MODE FOR CARRYING OUT THE INVENTION

First Embodiment

<Outline of Copying System in First Embodiment>

Figure 18:
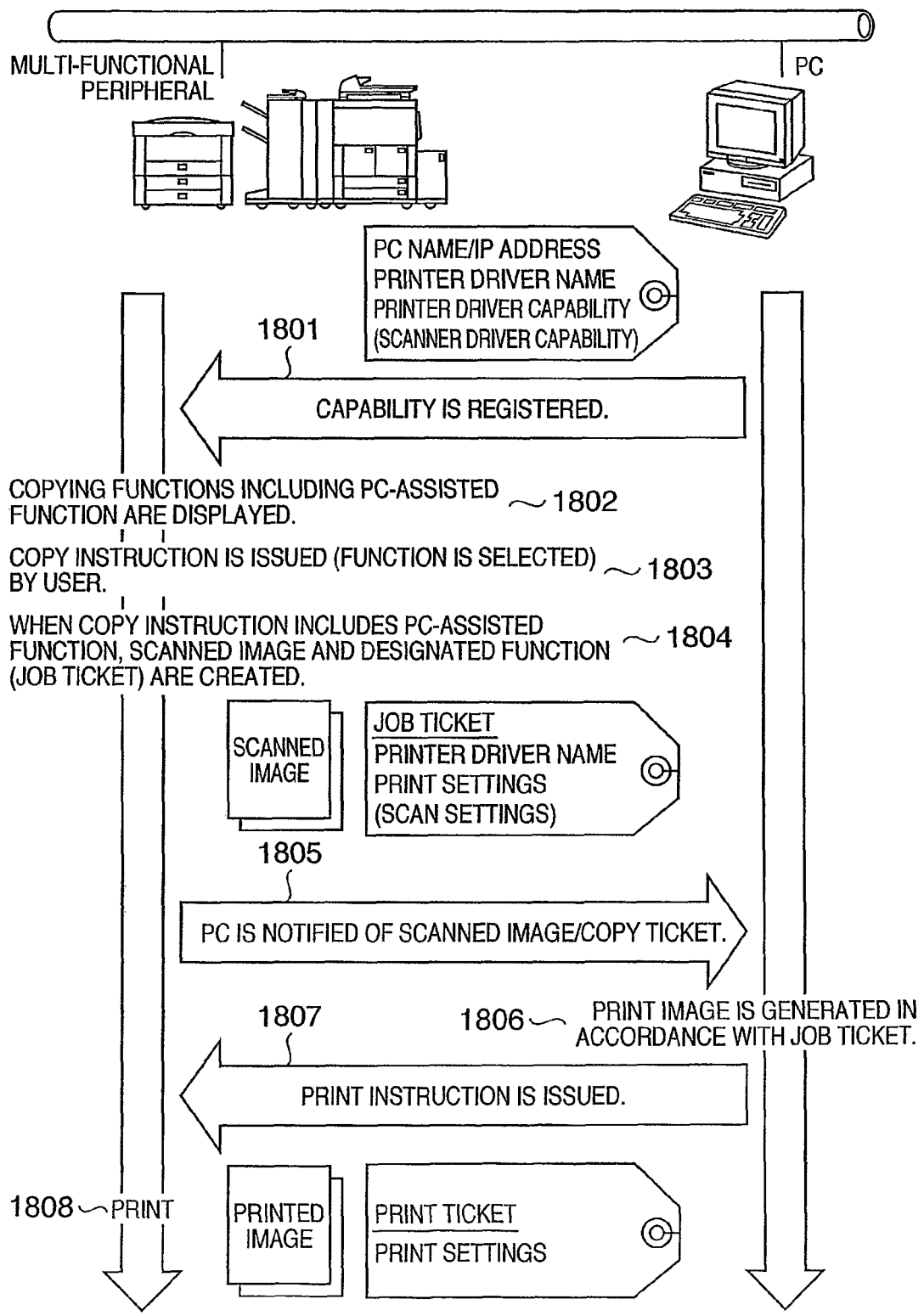
FIG. 18 is a view for explaining an outline of the configuration and operation of a copying system according to the present invention.

FIG. 18 is a view for explaining the operation of a copying system according to the present invention. In FIG. 18, a computer 20 is connected to a digital multi-functional peripheral (copying machine) 10 which can be used as a peripheral device of the computer 20 and is suitable for a copying apparatus according to the present invention. In the computer 20, a printer driver for utilizing the multi-functional peripheral as a printer is installed. The printer driver allows the user to designate print settings (e.g., settings of the layout, print style, and print quality). The multi-functional peripheral 10 independently functions as a copying machine. Some settings (e.g., double-sided copying) can be designated from the copying machine, and some print settings (e.g., a print layout of "9 pages/sheet": function of printing images of nine pages on one print sheet) can be designated only from the printer driver.

The PC 20 transmits in advance, to the multi-functional peripheral 10, registered capability information containing the name and IP address of the PC, the name of the printer driver, and information (printer driver capability information) on printer driver capability representing a PC-assisted copying function provided by a computer (1801). The printer driver capability information includes items which can be designated from the printer driver, and values (or ranges) selectable for the items. The printer driver capability information is also regarded as extended function information representing extended printer functions obtained by extending the functions of a single copying machine. Upon reception of the registered capability information, the multi-functional peripheral 10 saves it. The extended function information sometimes contains extended scanner functions representing functions provided by the scanner driver.

More specifically, when the printer unit of a copying machine is used as a printer connected to an information processing apparatus, the multi-functional peripheral 10 saves, in a registration memory 103 (see FIG. 1), extended function information representing extended printer functions which can be set in the information processing apparatus. The registration memory 103 corresponds to a save means according to the present invention.

After that, the multi-functional peripheral 10 refers to the registered capability information to display a list of functions selectable by the user on the operation panel (1802). The list contains items which are contained in printer driver capability information and can be designated from the printer driver, and items which can be designated in a copying operation by the single multi-functional peripheral 10. This list may be hierarchical or simply divided. That is, functions are displayed on the operation panel so that local functions (local copying functions) independently provided by the copying apparatus, and extended functions (PC-assisted copying functions) extended by the computer are presented to allow the user to set them.

That is, as copying functions which can be provided by the copying apparatus, the copying machine outputs local functions which can be independently provided by the copying apparatus, and functions represented by extended function information so as to allow the user to set these functions. This output (display) corresponds to a function presentation means according to the present invention.

If a copying operation is done by the user in this state and a function which should be executed in the copying operation is selected from the displayed list (1803), an original image is scanned and read. The copying machine determines whether the item of the selected function is contained in the printer driver capability information. If a plurality of functions are selected, the copying machine determines whether even one of the functions is contained in the printer driver capability information. If even one function is contained, the copying apparatus creates a job ticket which contains a corresponding printer driver name, and the identifier and value of the selected item of the printer driver capability information (1804). The job ticket corresponds to function setting information representing a set extended function. The copying machine transmits the job ticket and the read image data to the PC 20 (1805).

Upon reception of the job ticket, the PC 20 sets print setting information in accordance with the job ticket. More specifically, the PC 20 reads print setting information of the designated printer driver, and rewrites, in the print setting information, the item of the printer driver capability information contained in the job ticket into a value contained in the job ticket. The PC 20 generates a print instruction (print job) using, as one page, the received image data corresponding to one original document sheet (1806). The PC 20 transmits the generated print job to the multi-functional peripheral 10 (1807). The multi-functional peripheral executes the received print job, and prints (1808).

More specifically, when copying functions set by the user include the extended printer function, the copying machine transmits, to the connected information processing apparatus, image data read by the image scanner unit and function setting information representing the set extended printer function. When the copying machine receives, from the information processing apparatus, the print instruction containing image data and print setting information corresponding to the function setting information, the printer unit prints the image data in accordance with the print setting information. The series of processes correspond to a control means according to the present invention.

Figure 20:
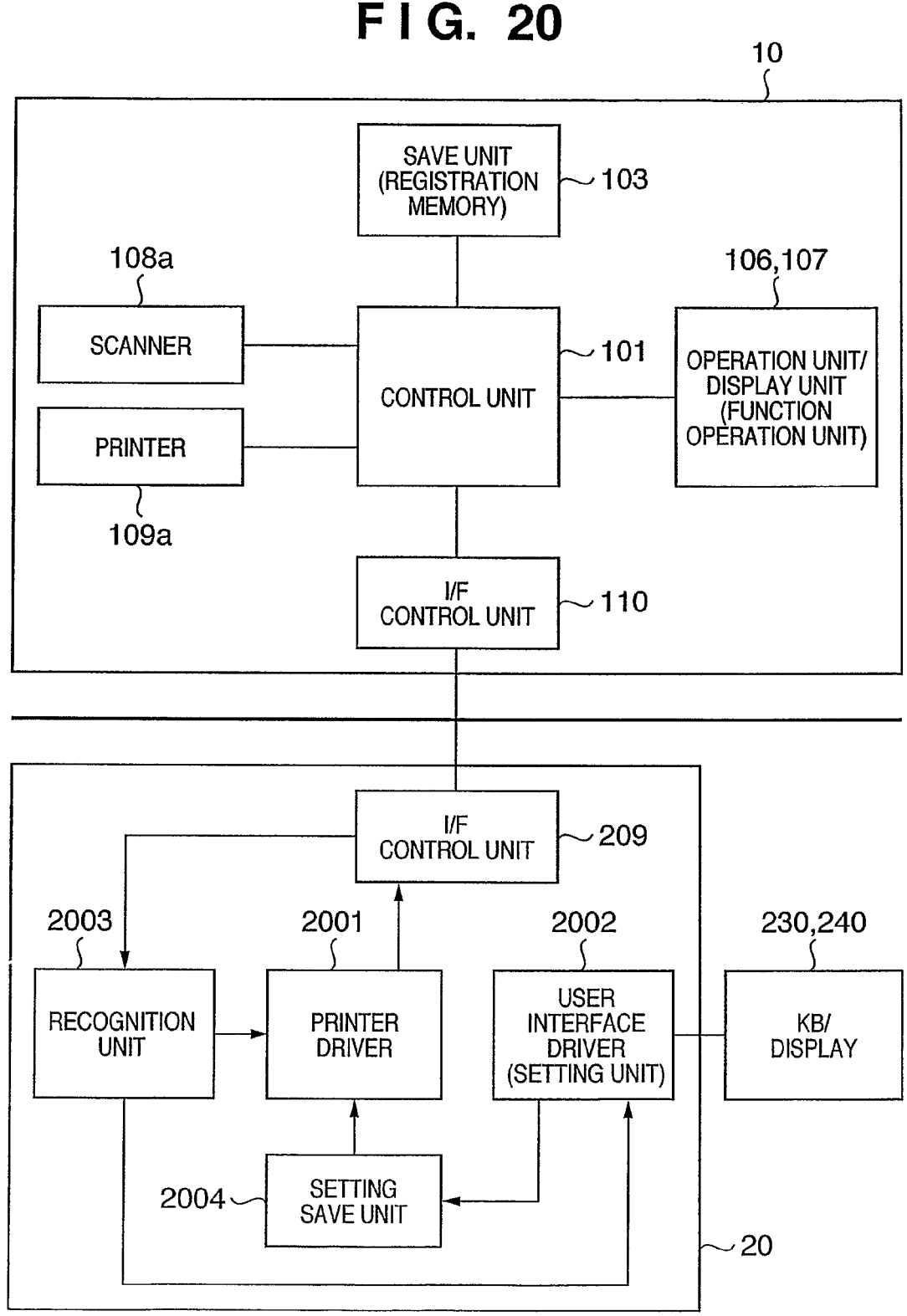
FIG. 20 is a block diagram showing the copying system according to the present invention.

FIG. 20 shows the functional blocks of the copying machine and information processing apparatus which execute the above operation. In FIG. 20, the copying machine 10 has an image scanner unit 108*a* and printer unit 109*a*, and is connected to the information processing apparatus 20. When the printer unit 109*a* is utilized as a printer connected to the information processing apparatus 20, extended function information representing extended printer functions which can be set in the information processing apparatus 20 are saved in the save means 103. By display on an operation unit/display unit 106 and 107 or the like, the copying machine 10 presents, to the user, local functions which can be independently provided by the copying machine 10, and functions (i.e., extended printer functions provided by the information processing apparatus 20) represented by the extended function information. The user selects a desired one of the presented functions, and if necessary, inputs parameters. When copying functions set by the user include an extended printer function, a control unit 101 transmits, to the connected information processing apparatus 20, image data read by the image scanner unit 108*a* and function setting information representing the set extended printer function. When the control unit 101 receives, from the information processing apparatus 20, a print instruction containing image data and print setting information corresponding to the function setting information, the printer unit 109*a* prints the image data in accordance with the print setting information.

The information processing apparatus 20 can communicate with the copying apparatus 10 having the printer unit which can be used as an independent peripheral device, and the apparatus 20 has a printer driver 2001. Upon reception of image data and extended function information representing copy settings from the copying apparatus 10, a recognition unit 2003 recognizes the reception. In response to the recognition that the extended function information has been received, a user interface driver (setting unit) 2002 is activated. The user interface driver 2002 saves print setting information input by the user in a setting save unit 2004 in accordance with copy settings represented by the extended function information for the printer driver 2001. The printer driver 2001 generates a print instruction complying with the set print setting information by using the image data as data to be printed, and transmits the generated print instruction to the copying apparatus. Hence, the printer driver 2001 also functions as a print instruction generation means.

In this manner, according to the copying system of the first embodiment, the user only operates the operation panel of the multi-functional peripheral, and can utilize copying functions including functions provided by the computer. The user can perform a copying operation using functions provided by the computer, similar to conventional copying using a single copying machine. The configuration and operation of the copying system according to the first embodiment will be explained in more detail.

<Image Processing Apparatus (Copying Machine)>

Figure 1:
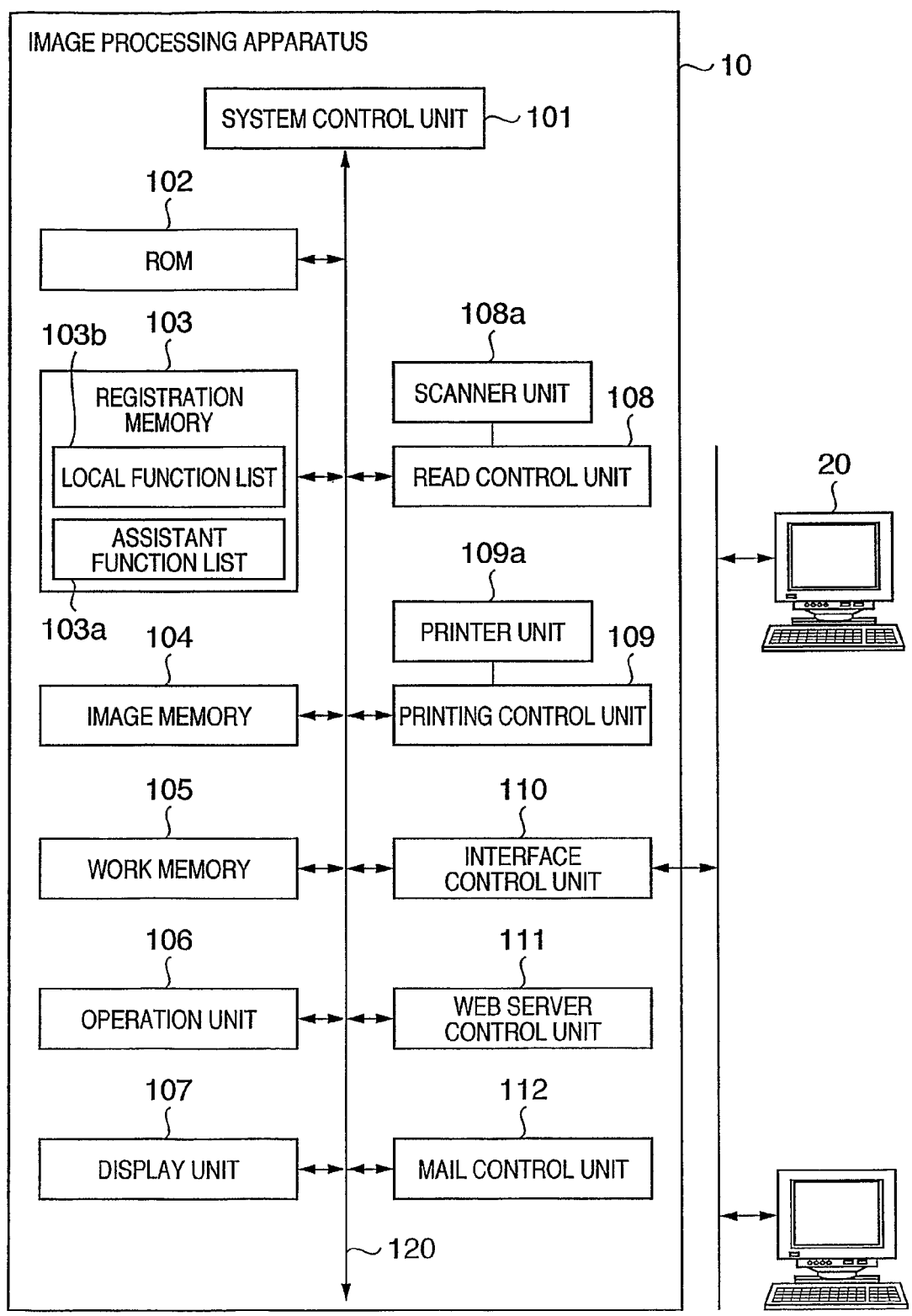
FIG. 1 is a block diagram showing the basic configuration of an image processing apparatus 10 according to the first embodiment of the present invention.

FIG. 1 is a block diagram showing the basic configuration of the image processing apparatus 10. The image processing apparatus 10 is a digital copying machine. The image processing apparatus 10 is connected to the information processing terminal 20 (i.e., computer) via a network, and can be used as a peripheral device of the computer. For this purpose, a printer driver corresponding to the printer unit 109a of the image processing apparatus 10 and a scanner driver corresponding to the image scanner unit 108a are installed in the computer.

The system control unit 101 controls the operation of the whole apparatus via a system bus 120. The system control unit 101 has, for example, a processor (CPU), and executes a program by the processor to implement this control. A ROM 102 stores the control program of the system control unit 101 and the like. The registration memory 103 is formed from a battery-backed-up SRAM, flash memory, or the like, and stores setting values, apparatus management data, and the like which are registered by the operator. For example, the registration memory 103 saves information (i.e., assistant function list 103a) which is received from the information processing terminal 20 (computer) by procedures to be described later and represents functions provided by the printer driver installed in the information processing terminal 20. The assistant function list 103a is printer driver capability information saved in the image processing apparatus 10.

This also applies to the scanner, and the assistant function list 103a also contains scanner driver capability information representing functions provided by the scanner driver. The registration memory 103 also saves a local function list 103b representing copying functions which can be provided by a single copying machine. Note that when information representing copying functions which can be provided by a single copying machine is, for example, hard-coded in a program, the local function list 103b can be omitted.

An image memory 104 is formed from a DRAM, hard disk, or the like, and stores image data to be printed and the like. A work memory 105 is formed from a DRAM, hard disk, or the like, and stores program control variables and the like. The operation unit 106 is formed from various keys and the like, and allows the operator to perform various inputs. The display unit 107 is formed from an LCD, LED, and the like, and provides various displays and audio outputs. Displayed information contains a copying function list (to be described later).

A read control unit 108 is formed from an image processing control unit and the like. The read control unit 108 digitizes electrical image data which is optically read and converted by an image sensor (e.g., CCD or CS) arranged in the image scanner unit 108a. The read control unit 108 performs various image processes (e.g., color process, binarization process, and halftone process) for the digital data, and outputs high-resolution image data. When the read control unit 108 is used as a peripheral scanner of the computer, the contents of an image process can be designated by scanner setting information. The read control unit 108 copes with either or both of an ADF scheme of reading an original image while conveying original document sheets on an automatic document feeder (ADF) one by one, and an original table scheme of reading an original image while an original document on the glass original table stands still.

A printing control unit 109 is formed from an image processing control unit and the like. The printing control unit 109 performs various image processes (e.g., smoothing process and print density correction process) for image data to be printed or the like, and converts the data into high-resolution image data, in order to form an image on paper by an electrophotographic or inkjet printer arranged in a printer unit 109a.

An interface control unit 110 communicates with an external terminal such as the information processing terminal 20 connected via a network, USB, or the like. The communication control method is a well-known one. The first embodiment adopts a LAN defined by IEEE803, and TCP/IP as an upper layer protocol. A Web server control unit 111 creates an HTML file containing an apparatus state and various job states, and provides a page in response to a browsing request from the information processing terminal 20 having a browser via the Internet. A mail control unit 112 creates mail information to be sent to the information processing terminal 20 upon generation of an error, at the end of printing, or the like.

<Configuration of Information Processing Terminal (Computer)>

Figure 2:
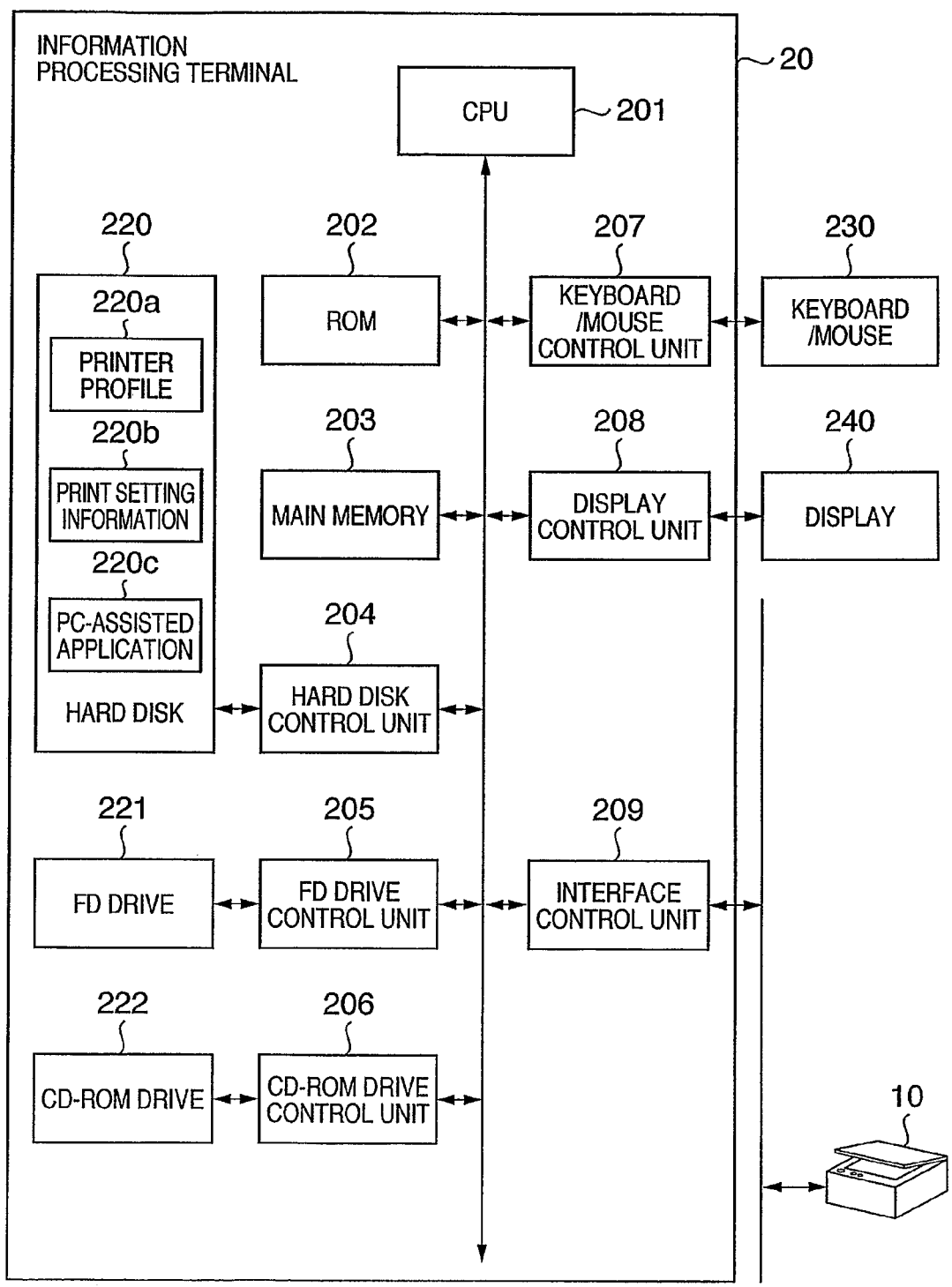
FIG. 2 is a block diagram showing the basic configuration of an information processing terminal 20 according to the first embodiment.

FIG. 2 is a block diagram showing the basic configuration of the information processing terminal 20 suitable for an information processing apparatus according to the present invention. A CPU 201 executes a program stored in a ROM 202, main memory 203, or hard disk 220, or a program read out from an FD drive 221 or CD-ROM drive 222, and controls the operation of the overall information processing terminal via a system bus.

The ROM 202 stores control programs and the like for the CPU 201. The main memory 203 temporarily stores programs and image data to perform a process by the information processing terminal at high speed. A hard disk control unit 204 controls the hard disk 220 which stores an operating system, various application programs, image data, and the like. Application software and driver software for transmitting/receiving various control instructions and data to/from the image processing apparatus 10, an operating system, and the like are installed in the hard disk 220. The installed driver software includes a printer driver and scanner driver for using the image processing apparatus 10 as a peripheral device. An example of the application software is a PC-assisted application 220c containing procedures in FIGS. 4A, 4B and 10, and the like. In general, the application software and driver software are installed from another computer-readable medium, which stores them, to the hard disk 220 via the FD drive 221, CD-ROM drive 222, or the like. The application software and driver software can also be downloaded via a network control unit 209a and installed in the hard disk 220.

The hard disk 220 saves printer profile information 220a and print setting information 220b. The printer profile information 220a is information on functions provided by the printer driver when the image processing apparatus 10 is utilized as a printer by the computer. The print setting information 220b is information referred to by the printer driver in order to generate a print job when the image processing apparatus 10 is utilized as a printer. These pieces of information correspond to the printer driver and are saved. This also applies to the scanner, and scanner profile information and scanner setting information (neither is shown) are also saved.

An FD drive control unit 205 controls the FD drive 221. A CD-ROM drive control unit 206 controls the CD-ROM drive 222. A keyboard/mouse control unit 207 controls a keyboard/mouse 230 serving as a means for inputting an instruction from the operator. A display control unit 208 controls a display 240 which presents various displays to the operator. An interface control unit 209 communicates with an external terminal such as the image processing apparatus 10 connected via a network, USB, or the like. The communication control method is a well-known one. The first embodiment adopts a LAN and TCP/IP, as described above.

FIG. 3 is a view showing an example of a PC-assisted copying function registration dialog in the information processing terminal 20. In the first embodiment, functions of implementing a copying process to perform scanning and printing via a PC will be called PC-assisted copying functions. Of the PC-assisted copying functions, functions associated with a printer will be called extended printer functions. Information representing printer driver functions provided for PC-assisted copying functions will be called printer driver capability information. That is, the PC-assisted copying functions mean printer driver capability information. This dialog is displayed by the above-described PC-assisted application. The PC-assisted application is installed as an application different from the printer driver in the hard disk 220, and activated. In FIG. 3, a combo box 301 is provided by the PC-assisted application 220c, and used to select a printer driver to be registered. When the user clicks a ▼ mark at the right end, a list of printer drivers having PC-assisted copying functions among printer drivers installed in the hard disk 220 of the information processing terminal 20 is displayed. This list can be displayed by referring to the printer profile 220a by the PC-assisted application 220c because the printer profile 220a also contains information representing the presence/absence of a PC-assisted copying function.

An area 302 displays available printer driver capabilities as PC-assisted copying functions. The area 302 displays the capabilities of a printer driver selected in the combo box 301. The first embodiment exemplifies a layout printing function (e.g., 2in1 to reduce and lay out two pages created by an application on one side of a sheet serving as a print medium, 4in1 to reduce and lay out four pages on one side of a sheet, and 8in1, 9in1, and 16in1), a poster printing function of dividing a 1-page image into 2×2, 3×3, 4×4, or the like for a plurality of sheets and printing the image, and a copy-forgery-inhibited pattern printing function of printing so that a hidden text appears upon copying printed paper. Target functions are not limited to them, and all functions of the printer driver can be PC-assisted copying functions. Note that functions provided by both the printer driver and image processing apparatus are displayed as local copying functions of the image processing apparatus.

When a registration button 303 is clicked, the PC-assisted application 220c transmits a PC-assisted copying function to the image processing apparatus 10 via the interface control unit 209. The IP address of the information processing terminal 20, a printer driver selected in the combo box 301, and printer driver capabilities available as PC-assisted copying functions displayed in the area 302 are transmitted.

<Registration of PC-Assisted Copying Function (Printer Driver Capability Information)>

FIG. 4A is a flowchart showing process procedures by the PC-assisted application program when a PC-assisted copying function, i.e., printer driver capability information is registered from the user interface in FIG. 3. The PC-assisted application program displays the user interface window shown in FIG. 3 (step S411). If a printer driver to be registered is selected in the user interface window, the PC-assisted application program displays functions provided by the printer driver in the column 302. In display, the printer profile information 220a is referred to. The PC-assisted application refers to printer profile information corresponding to the selected printer driver, and displays information on contained functions in a format which allows the user to understand the functions. In the example of FIG. 3, the printer driver capability information is displayed as a list of corresponding function names.

If the registration button 303 is clicked, the PC-assisted application combines the address (IP address in the first embodiment) and computer name of the information processing terminal, the selected printer driver name, and printer driver capability information which corresponds to the printer driver and is read from the printer profile. Then, the PC-assisted application adds a predetermined registration command to the combined set, and transmits the set to the image processing apparatus 10 (S412).

In the first embodiment, the PC-assisted application is installed in the hard disk 220 as an application different from the printer driver, and activated. Alternatively, the PC-assisted application may be installed as part of the printer driver in the hard disk 220, and the window in FIG. 3 may be displayed on the printer driver UI, or the process in FIG. 4A may be activated from the printer driver. When the PC-assisted application is installed as part of the printer driver in this manner, the combo box 301 for selecting a printer driver desirably displays the printer driver itself so as not to select another printer driver.

Figure 4B:
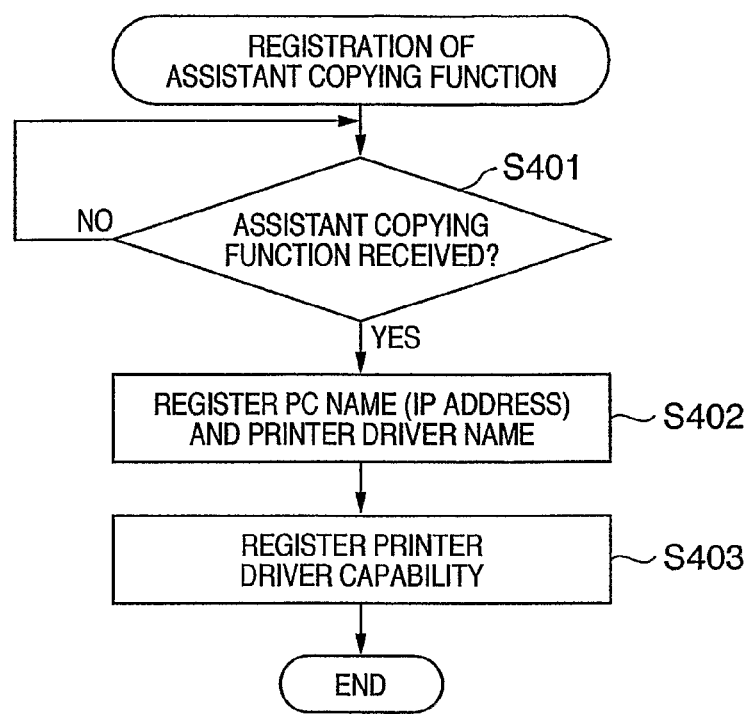

FIG. 4B is a flowchart showing a PC-assisted copying function registration process in the image processing apparatus 10. In step S401, the image processing apparatus 10 waits for reception of a PC-assisted copying function from the information processing terminal 20. The image processing apparatus may be configured to start the procedures in FIG. 4B in response to reception of a PC-assisted copying function from the information processing terminal 20. Upon reception of the PC-assisted copying function (printer driver capability information and registration command), the image processing apparatus 10 registers the received IP address and printer driver name of the information processing terminal 20 in the registration memory 103. In step S403, the image processing apparatus 10 registers the received printer driver capability information in the registration memory 103 so as to associate the printer driver capability information with the IP address and printer driver name. The registered IP address, printer driver name, and printer driver capability information associated with them are saved as the assistant function list 103a in the registration memory 103.

<Copying Process in Copying Machine (Image Processing Apparatus 10)>

Figure 5:
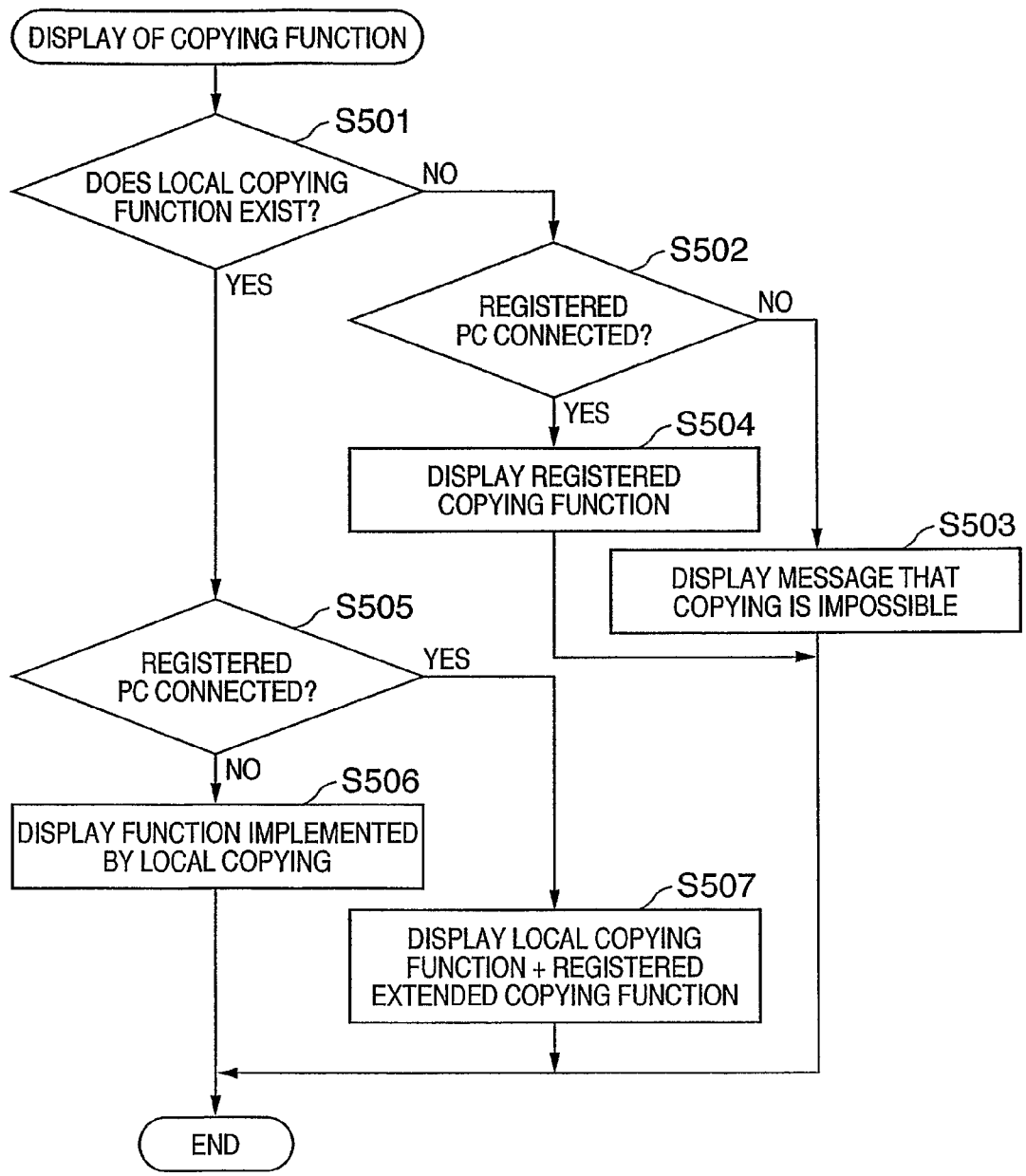
FIG. 5 is a flowchart showing a copying function display process in the image processing apparatus 10 according to the first embodiment.

FIG. 5 is a flowchart showing a copying function display process in the image processing apparatus 10. These procedures are executed when the image processing apparatus 10 is turned on or the function is switched from another function (e.g., facsimile transmission function) to the copying function. In step S501, it is determined whether the image processing apparatus 10 has a local copying function performed by the single image processing apparatus. This is because some low-end apparatuses do not have any local copying function but always perform PC-assisted copying. This is determined by referring to the local function list in the registration memory 103.

If it is determined in step S501 that the apparatus does not have any local copying function, it is determined in step S502 whether a registered PC is connected to a network and activated. This can be determined by issuing an acknowledgement command such as PING to the IP address of the information processing terminal 20 that is registered in step S402. Note that when no printer driver capability information is registered, the process proceeds similarly to a case wherein no registered information processing terminal is connected. Whether the printer driver capability information is registered can be determined by referring to the assistant function list 103a.

If it is determined in step S502 that the registered PC is neither connected nor activated, or no printer driver capability information is registered, a message that copying is impossible is displayed on the display unit 107, and the process ends (step S503). If it is determined in step S502 that the registered PC is connected and activated, PC-assisted copying functions are displayed. Display of functions will be described later with reference to FIGS. 6, 7, and 8.

If it is determined in step S501 that the apparatus has a local copying function, it is determined in step S505 whether a registered PC is connected to a network and activated. Similar to step S502, this can be determined by issuing an acknowledgement command such as PING. Note that when no printer driver capability information is registered, the process proceeds similarly to a case wherein no registered information processing terminal is connected.

If it is determined in step S505 that the registered PC is neither connected nor activated, or no printer driver capability information is registered, only functions which can be implemented by local copying are displayed on the display unit 107 (step S506). At this time, functions contained in the local function list 103b are displayed. If it is determined in step S505 that the registered PC is connected and activated, both local copying functions and PC-assisted copying functions are displayed in step S507. Local copying functions are displayed by referring to a local function list, and in addition, PC-assisted copying functions are displayed by referring to the assistant function list 103a. Display of functions in steps S506 and S507 will be described later with reference to FIGS. 6, 7, and 8.

Figure 6:
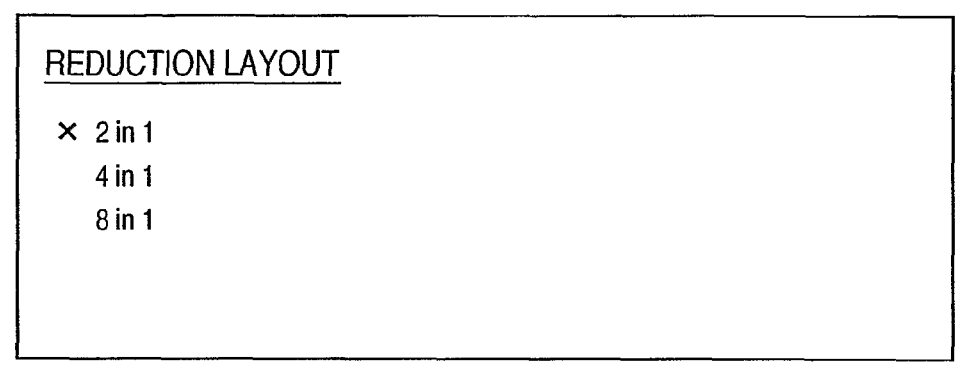

FIGS. 6, 7, and 8 are views showing examples of copying function display in the image processing apparatus 10. FIG. 6 shows an example of a display window displayed in step S506 when no printer driver capability information is registered, or a registered PC is neither connected nor activated. In this case, only functions (2in1, 4in1, and 8in1 in the first embodiment) which can be implemented by local copying are displayed.

FIG. 7 shows an example of a display window in step S507 when a registered PC is connected and activated. In this case, functions (layout printing function such as 9in1 and 16in1, and poster printing function such as 2×2, 3×3, and 4×4) which are registered in step S402 and can be implemented by PC-assisted copying are displayed in addition to functions (2in1, 4in1, and 8in1 in the first embodiment) which can be implemented by local copying. In the first embodiment, functions which can be implemented by PC-assisted copying are identifiably displayed with "(PC-assisted)". However, no explicit display need be presented. The same display (step S504) is presented when an apparatus does not have any local copying function. In this case, all functions are PC-assisted copying functions, so no explicit display need be presented. Alternatively, (PC-assisted) may be displayed only on a title "enlargement/reduction layout".

FIG. 8 shows an example of another display window in steps S504 and S507 when a registered PC is connected and activated. In this example, functions which can be implemented by PC-assisted copying are displayed as extended functions in an independent window. The window display is switched by tab switching or the like between the enlargement/reduction layout window shown in FIG. 7 and the extended function window shown in FIG. 8. Similar to FIG. 7, explicit display "(PC-assisted)" may or may not be displayed.

<Copying Process>

Figure 9:
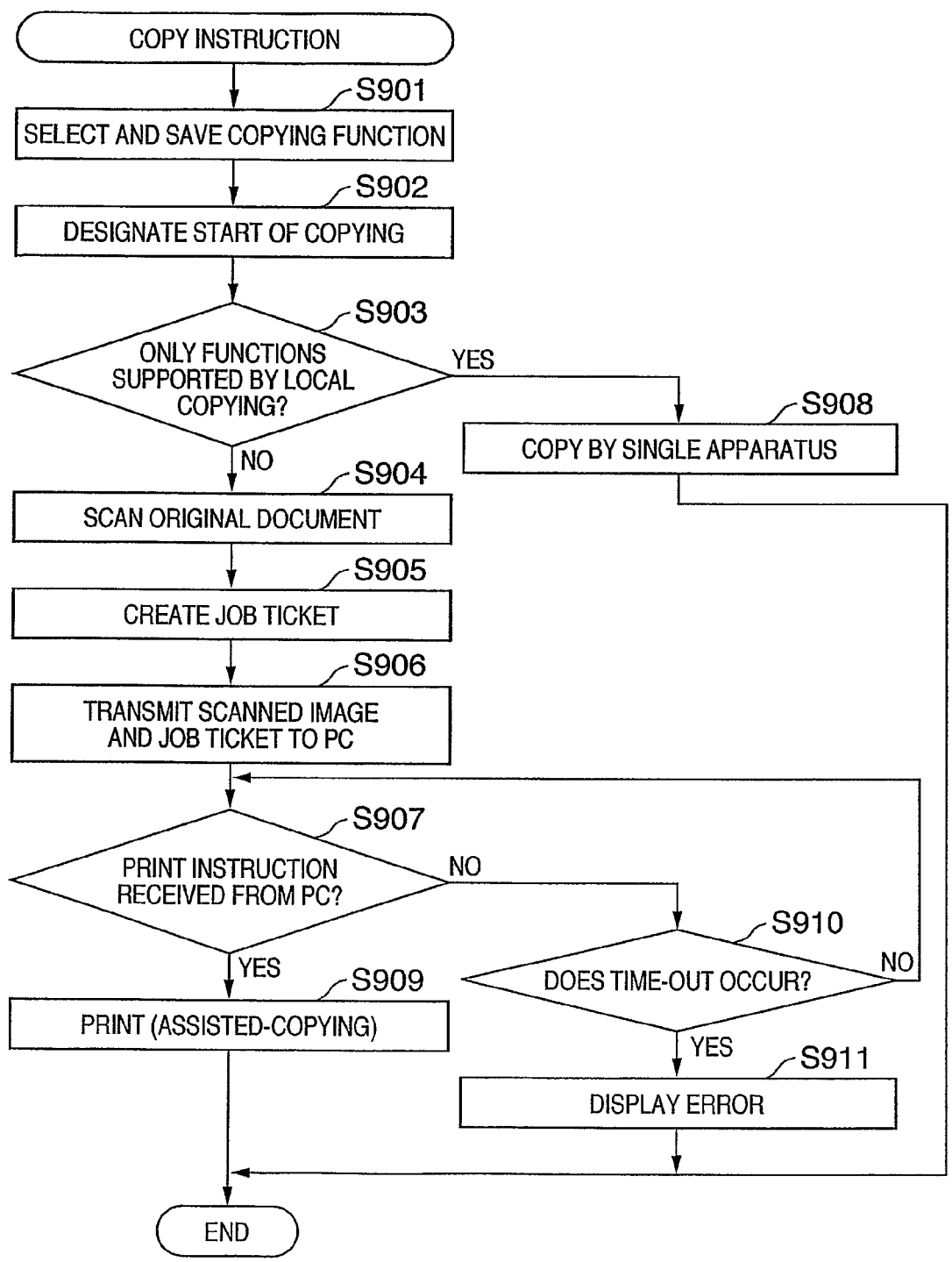
FIG. 9 is a flowchart showing a copy instruction process in the image processing apparatus 10 according to the first embodiment.

FIG. 9 is a flowchart showing a copy instruction process in the image processing apparatus 10. These procedures are executed by, e.g., the system control unit 101. In step S901, the user performs a copying function selection operation. This operation is done by selecting a desired function by the user from a function display window as shown in FIG. 6, 7, or 8. Information (selected function information) representing the selected function is saved in the main memory 203 in step S901. Steps S901 and S902 need not be successive, and the flow may temporarily wait for an input after step S901.

If the user designates the start of copying in step S902, the process from step S903 starts in response to the designation. The copy start instruction operation is done by pressing a copy button (not shown) on the operation unit 106.

In step S903, it is determined whether all functions selected in step S901 are supported by local copying of the single copying machine (image processing apparatus 10). This can be determined by determining whether all the selected functions saved in step S901 are contained in the local function list 103b. If it is determined that all functions are supported by local copying, i.e., all selected functions are contained in the local function list 103b, the flow branches to step S908. In step S908, designated copying is performed by the single image processing apparatus 10, and the process ends. Copying by the single image processing apparatus is identical to that implemented by a conventional copying machine. For example, image data of an original image read by the read control unit 108 is temporarily stored in the image memory under the control of the system control unit. A process corresponding to the selected function is executed by the system control unit 101, and the image data is printed out by the printing control unit 109.

If it is determined in step S903 that a function registered as a PC-assisted copying function is selected, an original document is read by the read control unit 108, and the image data is saved in the image memory 104. In saving, image data are saved page by page such that image data of a 1-page original document is saved as one image data file. Image data may be directly transmitted to the information processing terminal 20 without saving the image data. When the image processing apparatus 10 comprises a storage device such as a hard disk, image data may be saved in the storage device.

In step S905, a job ticket representing the selected copying function is generated. The job ticket contains, as computer-processable information, a printer driver name registered in step S402 and the item and value of a function selected in step S901. The job ticket may contain various types of information (e.g., paper size and the number of copies) used for printing. In the first embodiment, when a PC-assisted function is selected, all selected functions are processed by the printer driver. However, only a PC-assisted function may be processed by the printer driver. This example will be described later as a modification to the first embodiment.

In step S906, the loaded/scanned image data and job ticket are transmitted to the information processing terminal 20. In steps S907 and S910, the image processing apparatus 10 waits for a print instruction from the information processing terminal 20. The print instruction received at this time is a so-called print job, and contains image data of each page to be printed and print setting information which designates print settings.

If it is determined in step S907 that the image processing apparatus 10 has received a print instruction from the information processing terminal 20, the image processing apparatus 10 performs designated printing in accordance with the print setting information in step S909, and the process ends. The printing process in step S909 is the same as a printing process when the information processing terminal 20 utilizes the printing function of the image processing apparatus 10 as a printer. That is, procedures when a conventional printer receives a print job from a computer and executes a printing process are executed in step S909.

If the image processing apparatus 10 does not receive any print instruction from the information processing terminal 20 in step S907, it is determined in step S910 whether a predetermined time has elapsed. If the predetermined time has elapsed, a message that PC-assisted copying results in an error is displayed on the display unit 107 in step S911, and the process ends.

The job ticket is described in JDF (Job Definition Format) defined using XML. The job ticket has a format for describing instructions for a printing function, pre-process, and post-process. The job ticket can satisfactorily describe functions provided by the copying machine and those provided by the printer driver of the computer. Hence, a selected function can be described in the job ticket by using a tag defined for each item of the selected function and describing the value of the item in correspondence with the tag. Needless to say, the format is not limited to JDF, and any format can be employed as far as functions provided by the copying machine, functions provided by the printer driver of the computer, information for specifying a printer driver, and the like are described in a format interpretable by the information processing terminal 20.

Figure 10:
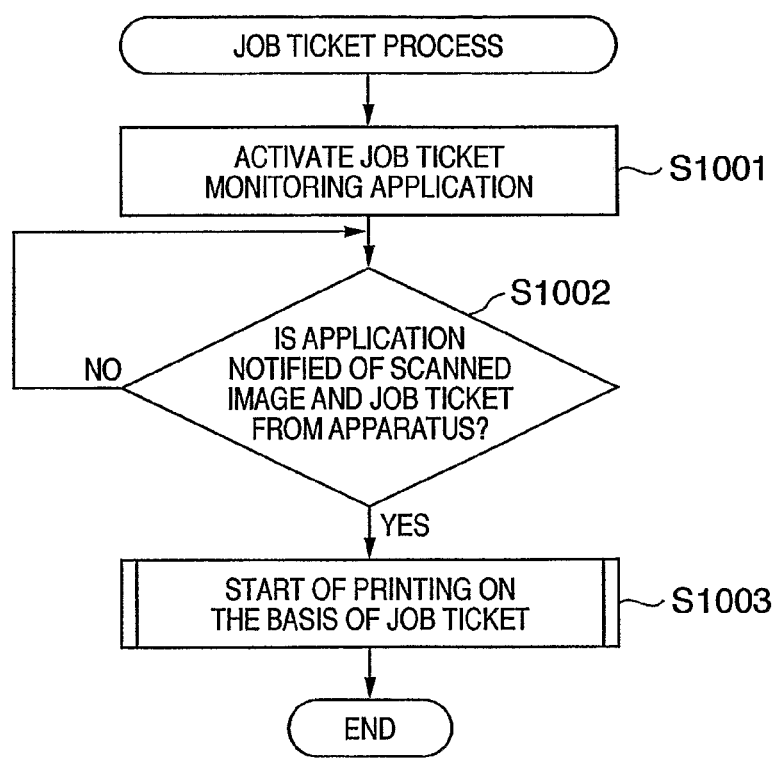
FIG. 10 is a flowchart showing a job ticket process in the information processing terminal 20 according to the first embodiment.

FIG. 10 is a flowchart showing process procedures when the information processing terminal 20 performs the process of a job ticket issued by the image processing apparatus 10 in step S906 of FIG. 9.

In step S1001, a job ticket monitoring application is activated. The job ticket monitoring application is installed in the hard disk 220 as an application different from the printer driver. The job ticket monitoring application may be activated automatically when the information processing terminal 20 is turned on, or individually by the user. In the first embodiment, the job ticket monitoring application is described as part of the PC-assisted application, but these programs may be independent of each other. The process from step S1002 is executed by the job ticket monitoring application.

In step S1002, the job ticket monitoring application determines whether it receives a scanned image and job ticket from the image processing apparatus 10. That is, the job ticket monitoring application waits for reception of the scanned image data and job ticket from the image processing apparatus 10. The image data and job ticket are information transmitted from the image processing apparatus 10 in step S906. Upon reception of the scanned image data and job ticket, the job ticket monitoring application starts a printing operation based on the contents of the job ticket in step S1003. In order to execute various printing functions described in the job ticket, the job ticket monitoring application calls a printer driver described in the job ticket, executes various printing processes, and instructs the image processing apparatus 10 to print. In response to the print instruction, the image processing apparatus 10 prints in step S909, and the PC-assisted copying process is completed.

Figure 19A:
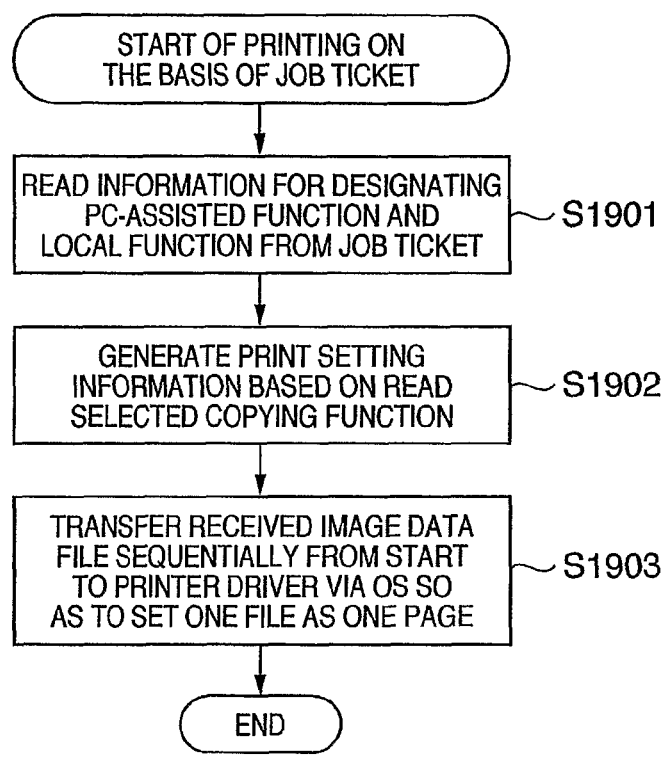
FIGS. 19A and 19B are flowcharts showing print job issuing procedures based on a job ticket by an information processing terminal according to the present invention.

FIG. 19A is a flowchart for explaining in more detail the process in step S1003. The job ticket monitoring application reads a selected copying function from the job ticket (S1901), i.e., reads PC-assisted function information and local function information. The job ticket monitoring application generates print setting information based on the read selected copying function (S1902). For this purpose, the job ticket monitoring application reads out the print setting information 220b (saved in correspondence with a printer driver) corresponding to a printer driver designated by the job ticket. Of the readout print setting information, an item corresponding to the selected copying function described in the job ticket is rewritten into the value of the item described in the job ticket. The item of the selected copying function and that of print setting information can be made to correspond to each other by preparing a correspondence table for the tag name of a job ticket and the item of print setting information. The job ticket monitoring application saves the print setting information. If a change of the print setting information requires the intervention of the operating system or printer driver, the print setting information is changed in accordance with necessary procedures.

In step S1903, the job ticket monitoring application calls the function (API) of the operating system, transfers the received image data sequentially from the start as print data to the printer driver, and causes the printer driver to print. In the first embodiment, the job ticket monitoring application causes the printer driver to print received image data. However, the present invention is not limited to this, and the job ticket monitoring application may activate a scanner driver in driver software stored in the hard disk 220, and instruct the printer driver to print image data received from the image processing apparatus by using the scanner driver. Also in this case, the job ticket monitoring application instructs the printer driver on print settings in the job ticket by using an API called a driver SDK.

Figure 19B:
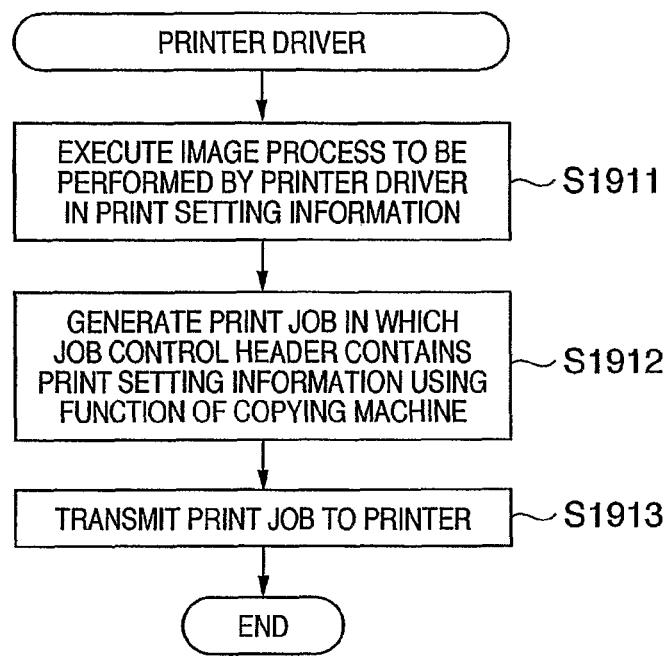

FIG. 19B is a flowchart simply showing a process by the printer driver upon reception of print data. The printer driver operates similarly to a conventional one, and does not require any new function for the embodiment. However, when the printer driver performs a PC-assisted application function, the process branches from step S1902 in FIG. 19A to step S1911 in FIG. 19B. In FIG. 19B, the printer driver reads the print setting information 220b, and executes a process among set items that is not provided by the image processing apparatus 10 and should be executed as a software process by the printer driver itself. For example, when the poster printing function is implemented by a software process of the printer driver, the printer driver performs enlargement of image data to a designated size and division into a designated number. When the copy-forgery-inhibited pattern printing function is set, the printer driver reads out a hidden image pattern managed by it, and adds the hidden image pattern to image data.

After that, the printer driver generates a print job which is described in, e.g., the page description language (PDL) and contains, as parameters, values described in the job ticket (or corresponding values) for items of print setting information using functions of the image processing apparatus 10. First, the printer driver generates, in accordance with the PDL rules, a job control header in which, among selected copying functions described in the job ticket, items except items processed in step S1911 are values of the job ticket description (S1912). The printer driver transmits, to the image processing apparatus 10, data which describes data to be printed in accordance with the PDL rules after the header. The process in step S1913 utilizes functions provided by the operating system.

In the above way, when the copying machine according to the first embodiment is operated, it transmits information on extended functions as a job ticket to the computer. The computer writes, in print setting information of a print job, copy settings described in the received job ticket, issues the print job to the copying machine, and causes the copying machine to print using the printer function of the copying machine. As a result, extended functions provided by the computer can be utilized in a copying process without the intervention of the user on the computer.

Second Embodiment

In the first embodiment, only functions of the printer driver can be registered as PC-assisted copying functions in the image processing apparatus 10. When an original document is scanned by the scanner driver, functions of the scanner driver can also be registered. In the second embodiment, a description of a part common to the first embodiment will be omitted.

FIG. 11 is a view showing an example of a registration dialog for a PC-assisted copying function (printer driver capability information) in an information processing terminal 20. This dialog is displayed by the same procedures as those in FIG. 4A, and a function is registered. This application is installed in a hard disk 220 as an application different from the printer driver, and activated.

A combo box 1101 is used to select a printer driver to be registered, and is identical to the combo box 301.

An area 1102 displays available printer driver capabilities as PC-assisted copying functions, and is identical to the column 302.

A combo box 1103 is used to select a scanner driver to be registered. When the user clicks a ▼ mark at the right end, a list of scanner drivers having PC-assisted copying functions among scanner drivers installed in the hard disk 220 of the information processing terminal 20 is displayed.

An area 1104 displays available scanner driver capabilities as PC-assisted copying functions. The area 1104 displays the capabilities of a scanner driver selected in the combo box 1103. The second embodiment exemplifies a dust/scratch reduction function of reducing white fine paper dust or mote which stands out at a dark portion such as hair, a fading correction function of correcting color cast and fading generated in an old photograph or the like, and a moiré reduction function of reducing density nonuniformity and stripe patterns generated upon scanning a printed product. Target functions are not limited to them, and all functions of the scanner driver can be PC-assisted copying functions.

When a registration button 1105 is clicked, PC-assisted copying functions are transmitted to an image processing apparatus 10 via an interface control unit 209. The IP address of the information processing terminal 20, a printer driver selected in the combo box 1101, printer driver capabilities (i.e., printer driver capability information) displayed in the area 1102, a scanner driver selected in the combo box 1103, and scanner driver capabilities (i.e., scanner driver capability information) displayed in the area 1104 are transmitted. In this fashion, a pair of printer driver capability information and scanner driver capability information is selected and transmitted to the image processing apparatus.

Figure 12:
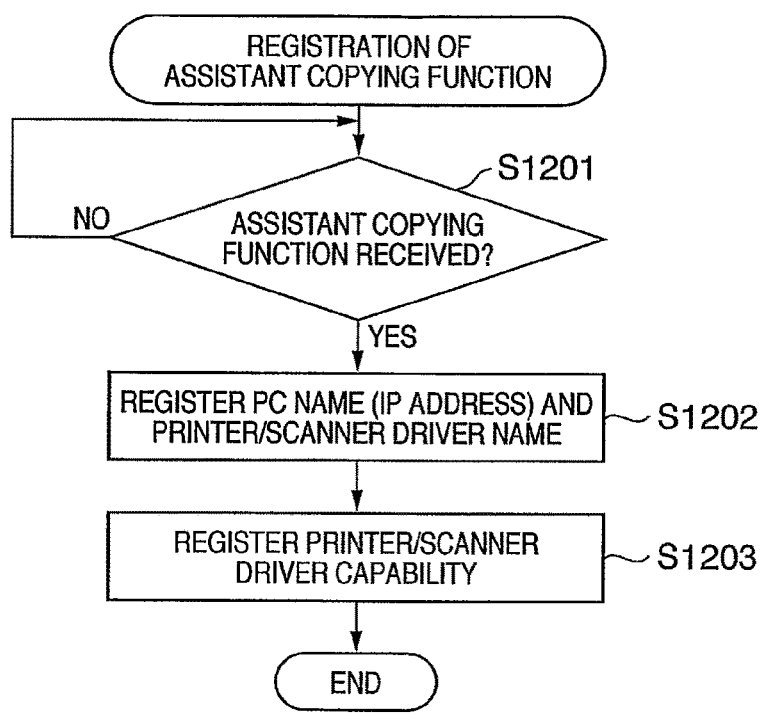
FIG. 12 is a flowchart showing a PC-assisted copying function registration process in an image processing apparatus 10 according to the second embodiment.

FIG. 12 is a flowchart showing a PC-assisted copying function registration process in the image processing apparatus 10.

In step S1201, the image processing apparatus 10 waits for reception of a PC-assisted copying function from the information processing terminal 20. Upon reception of the PC-assisted copying function, the image processing apparatus 10 registers the received IP address and printer driver name/scanner driver name of the information processing terminal 20 in a registration memory 103. In step S1203, the image processing apparatus 10 registers the received printer driver capability/scanner driver capability in the registration memory 103 so as to associate the printer driver capability/scanner driver capability with the IP address and printer driver name/scanner driver name. Then, the process is completed. Even information on the scanner may be contained in a printer profile 220a.

A copying function display process in the image processing apparatus 10 according to the second embodiment is the same as that in FIG. 5, and a description thereof will be omitted. Display of copying functions in the image processing apparatus 10 according to the second embodiment is the same as those of FIGS. 6 and 7, and a description thereof will be omitted.

FIG. 13 shows an example of a copying function display window in steps S504 and S506 in the procedures of FIG. 5 that are executed in the second embodiment when a registered PC is connected and activated. FIG. 8 shows only the copy-forgery-inhibited pattern printing which can be implemented by the printer driver. In FIG. 13, the dust/scratch reduction function, fading correction function, and moiré reduction function which can be implemented by the scanner driver are also added. Similar to FIG. 8, explicit display "(PC-assisted)" may or may not be displayed.

Figure 14:
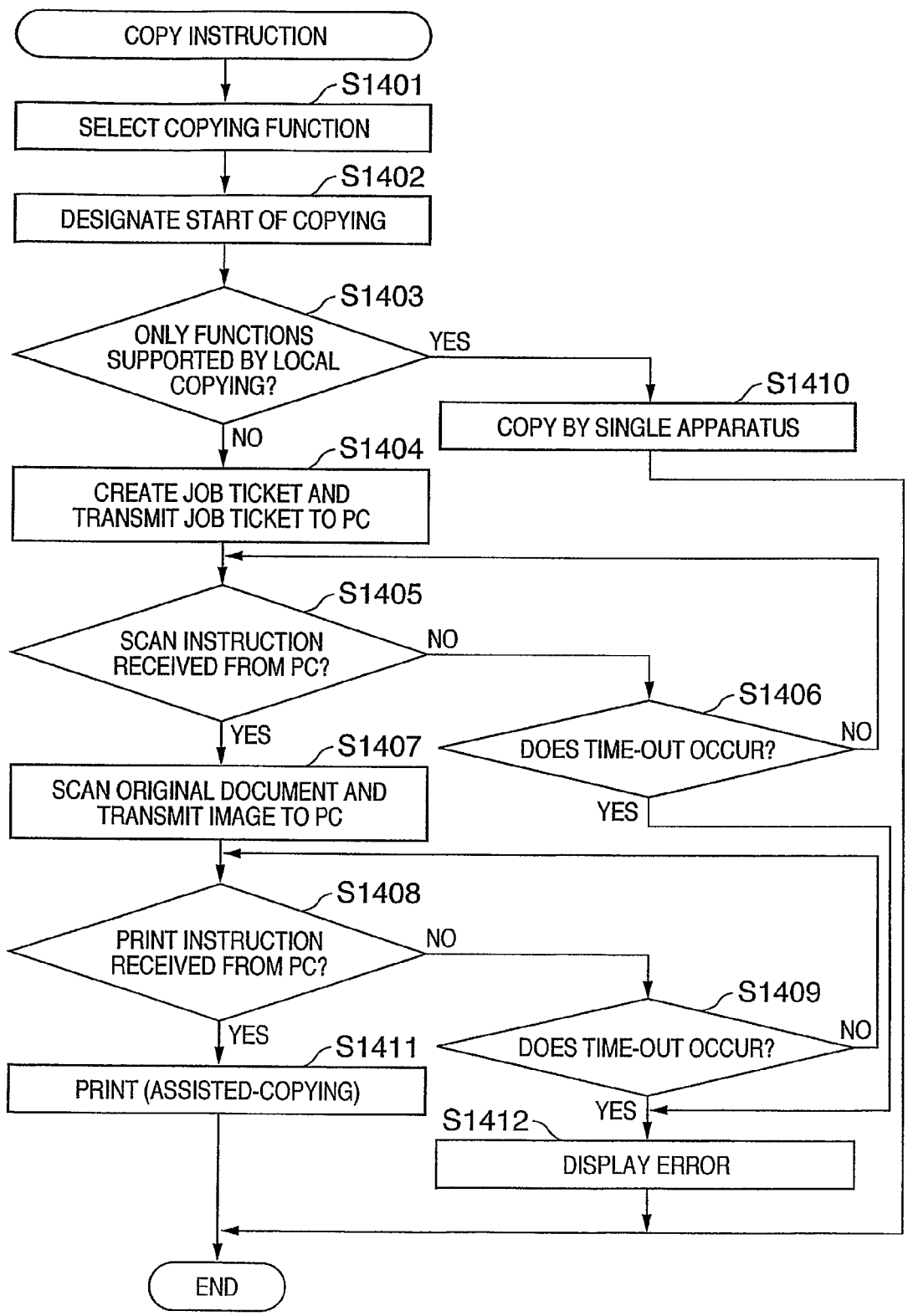
FIG. 14 is a flowchart showing a copy instruction process in the image processing apparatus 10 according to the second embodiment.

FIG. 14 is a flowchart showing a copy instruction process in the image processing apparatus 10. This process corresponds to FIG. 9 according to the first embodiment. In step S1401 of FIG. 14, the user selects a copying function. This operation is done by selecting a desired function by the user from a function display window as shown in FIG. 6, 7, or 13. The selected function is saved as a selected copying function in the main memory.

In step S1402, the user designates the start of copying by, for example, pressing a copy button (not shown) on an operation unit 106. In response to this, a process in the image processing apparatus starts.

In step S1403, it is determined whether all functions selected in step S1401 are supported by local copying. If it is determined that all functions are supported by local copying, designated copying is performed by the single image processing apparatus 10 in step S1410, and the process ends.

If it is determined in step S1403 that a function registered as a PC-assisted copying function (printer driver capability information) is selected, a job ticket is created and transmitted to the information processing terminal 20. The job ticket contains a printer driver name/scanner driver name registered in step S1202 and a PC-assisted copying function selected in step S1401. The job ticket may contain various types of information (e.g., paper size and the number of copies) used for printing.

In step S1405, it is determined whether the image processing apparatus 10 has received a scan instruction from the information processing terminal 20. If it is determined in step S1405 that the image processing apparatus 10 has received a scan instruction from the information processing terminal 20, the image processing apparatus 10 performs scanning in accordance with the instruction, and transfers the scanned image data to the information processing terminal 20 in step S1407. If the image processing apparatus 10 does not receive any scan instruction from the information processing terminal 20 in step S1405, it is determined in step S1406 whether a predetermined time has elapsed. If the predetermined time has elapsed, a message that PC-assisted copying results in an error is displayed on a display unit 107 in step S1412, and the process ends.

After the image processing apparatus 10 transfers the scanned image to the information processing terminal 20 in step S1407, it is determined in step S1408 whether the image processing apparatus 10 has received a print instruction (i.e., print job) from the information processing terminal 20.

If the image processing apparatus 10 receives a print instruction from the information processing terminal 20 in step S1408, the image processing apparatus 10 performs designated printing in step S1411, and the process ends. If the image processing apparatus 10 does not receive any print instruction from the information processing terminal 20 in step S1408, it is determined in step S1409 whether a predetermined time has elapsed. If the predetermined time has elapsed, a message that PC-assisted copying results in an error is displayed on the display unit 107 in step S1412, and the process ends.

Figure 15:
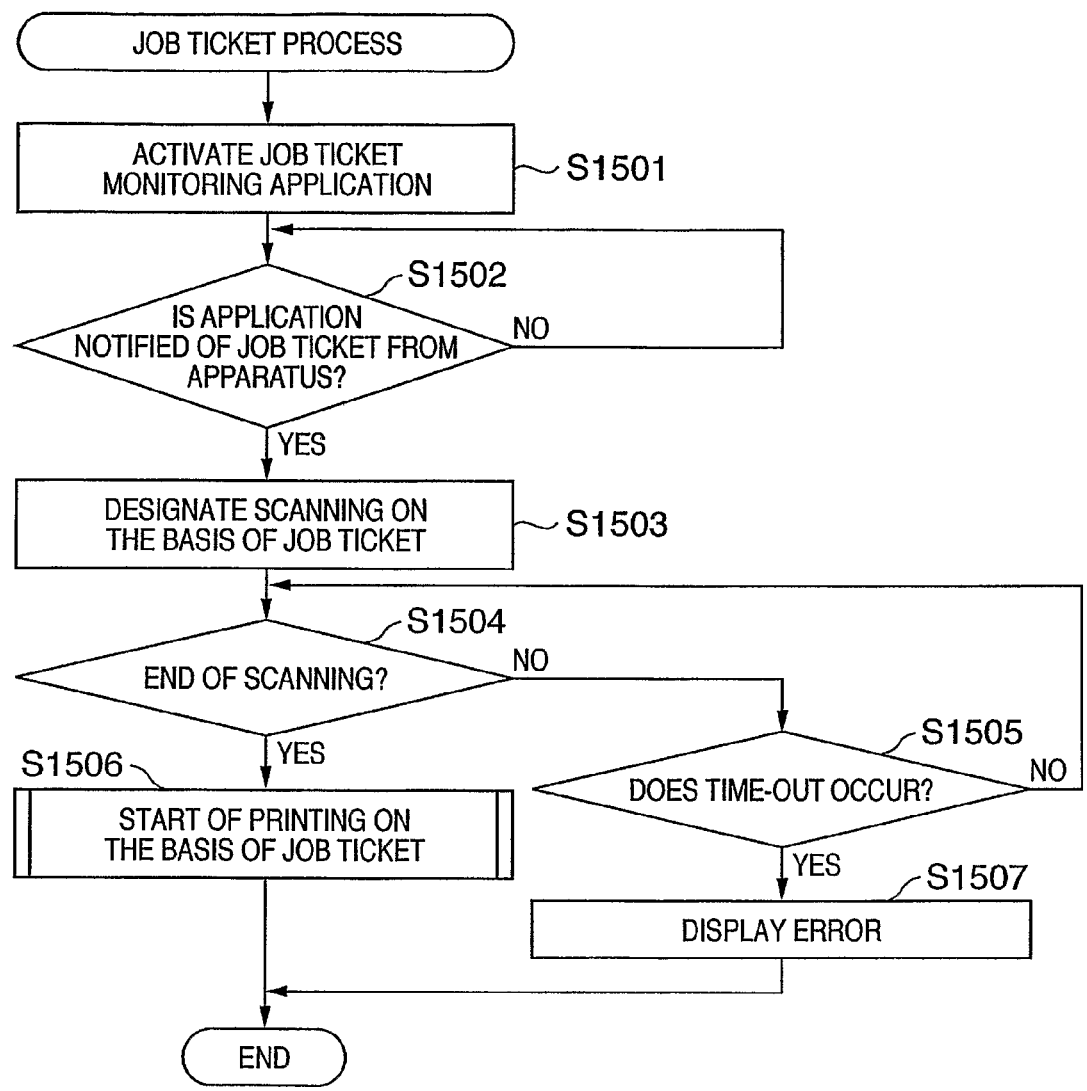
FIG. 15 is a flowchart showing a job ticket process in the information processing terminal 20 according to the second embodiment.

FIG. 15 is a flowchart showing a job ticket process in the information processing terminal 20. In step S1501, a job ticket monitoring application is activated. The job ticket monitoring application is installed in the hard disk 220 as an application different from either the printer driver or scanner driver. The job ticket monitoring application may be activated automatically when the information processing terminal 20 is turned on, or individually by the user.

In step S1502, the job ticket monitoring application determines whether it receives a job ticket from the image processing apparatus 10. The job ticket is information transmitted from the image processing apparatus 10 in step S1404. Upon reception of the job ticket, the job ticket monitoring application starts a scanning operation based on the contents of the job ticket in step S1503. In order to execute various scanning functions described in the job ticket, the job ticket monitoring application rewrites scanner setting information corresponding to a scanner driver into values corresponding to extended scanner functions described in the job ticket. The job ticket monitoring application calls a scanner driver described in the job ticket, and instructs the image processing apparatus 10 to transfer a scanned image. In response to the scan instruction, the image processing apparatus 10 performs scanning in step S1407. Note that when a function which should be performed in software by the scanner driver is contained in selected copying functions, a process to perform a selected function is executed by the scanner driver for read image data.

In step S1504, the job ticket monitoring application determines whether transfer of the scanned image has ended. If the job ticket monitoring application determines that transfer of the scanned image has ended, it starts a printing operation based on the contents of the job ticket in step S1506. In order to execute various printing functions described in the job ticket, the job ticket monitoring application calls a described printer driver, executes various printing processes, and instructs the image processing apparatus 10 to print. In response to the print instruction, the image processing apparatus 10 prints in step S1411, and the PC-assisted copying process is completed.

If the job ticket monitoring application determines in step S1504 that transfer of the scanned image has not ended, it determines in step S1505 whether a predetermined time has elapsed. If the predetermined time has elapsed, a message that PC-assisted copying results in an error is displayed on a display 240 in step S1507, and the process ends.

By the above-described configuration and processes, according to the second embodiment in addition to the effects of the first embodiment, extended scanner functions provided by the scanner driver can be added as some of PC-assisted copying functions, and selected by the copying machine. No special operation for this is required, and extended functions (PC-assisted copying functions) can be utilized by only selecting functions in the copying machine and designating the start of copying.

Third Embodiment

In the above embodiments, the number of PC-assisted copying functions which can be registered in the image processing apparatus 10 is only one. However, a plurality of assistant copying functions may also be registered. The basic process is the same as those in the first and second embodiments, and only a difference will be described.

FIG. 16A is a view showing a PC-assisted copying function registration dialog when a plurality of PC-assisted copying functions can be registered. Portions 1601 to 1605 are functionally identical to the portions 1101 to 1105 in FIG. 11, and a description thereof will be omitted.

In FIG. 16A, reference numeral 1606 denotes a name which is registered as an assistant copying function in an image processing apparatus 10. The user checks this name, and can identify an information processing terminal 20 and its printer driver/scanner driver which is used as a PC-assisted copying function.

In step S402 of FIG. 4B and step S1202 of FIG. 12, the image processing apparatus 10 also registers the name set in 1606 in a registration memory 103 together with the IP address of the information processing terminal 20 and the like.

Figure 16B:
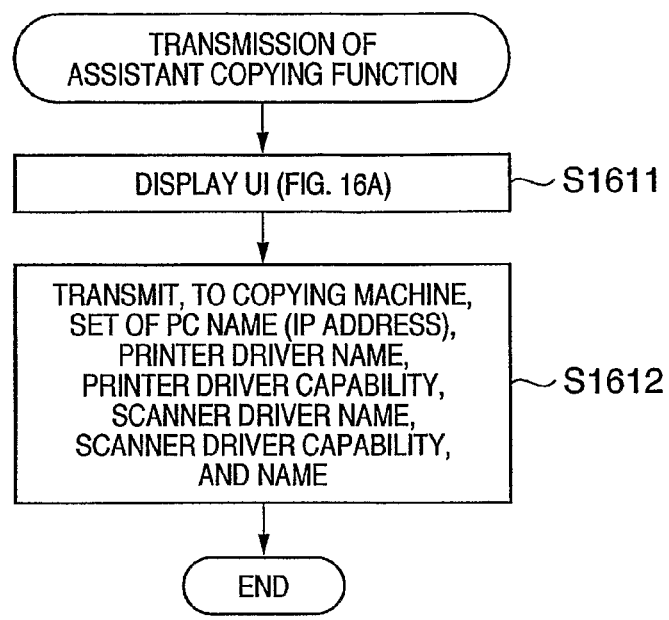
FIG. 16B is a flowchart showing procedures for registering a PC-assisted copying function in a user interface.

FIG. 16B shows process procedures by the information processing terminal 20 when a PC-assisted copying function is registered in the image processing apparatus 10 via the user interface in FIG. 16A. First, the information processing terminal 20 displays the user interface in FIG. 16A (step S1611). If a printer driver is designated in the user interface, the information processing terminal 20 reads a corresponding function list from a printer profile 220a, and displays the list. If a scanner driver is designated, the information processing terminal 20 reads a corresponding function list from a scanner profile, and displays the list. If the name 1606 is input and the registration button 1605 is clicked, the information processing terminal 20 transmits, to the image processing apparatus 10, a set of the name of registered information, an extended printer function, and an extended scanner function as information representing PC-assisted copying functions (i.e., printer driver capability information and scanner driver capability information). Upon reception of the information, the image processing apparatus 10 saves it.

Similar to the first embodiment, the process in FIG. 5 is executed when the image processing apparatus 10 is turned on or the function is switched from another function (e.g., facsimile transmission function) to the copying function.

Note that in steps S502 and S505 of FIG. 5, a command such as PING is issued to the IP addresses of all registered information processing terminals 20, and it is determined whether each information processing terminal 20 is connected to a network and activated.

FIG. 17 shows a window for selecting which PC-assisted copying function is to be used in the image processing apparatus 10. An information processing terminal 20 which is determined in step S502 or S505 not to be connected or activated is desirably grayed out or is not displayed, informing the user that the information processing terminal 20 is unavailable. In FIG. 17, the user selects a PC-assisted function for use by designating the name of the PC-assisted function among registered PC-assisted functions, i.e., pairs of printer driver capability information and scanner driver capability information. If the user selects one name, a copying process using the selected PC-assisted copying function is the same as that in the first and second embodiments.

Note that the window in FIG. 17 may be displayed at the beginning in steps S504, S506, and S507 of FIG. 5, or may be switched by tab switching or the like from the enlargement/reduction layout window shown in FIG. 7 or the extended function window shown in FIG. 8 or 13.

The PC-assisted function shown in FIG. 7, 8, or 13 is a function which is registered in the registration memory 103 as a function of a driver selected in FIG. 17.

[First Modification]

In the embodiments, a PC-assisted application is used to extend the function of a copying machine. However, the copying system can also be configured by a PC-assisted application using a single-function scanner and a single-function printer. In this case, for example, the scanner plays the role of a copying machine in the embodiments.

[Second Modification]

In step S905 of FIG. 9, a job ticket contains not only a PC-assisted function but also all selected copying functions, and is transmitted to the information processing terminal. However, the job ticket may contain a PC-assisted function and be transmitted to the information processing terminal. In this case, the image processing apparatus 10 does not function as the printer of the information processing terminal, but functions as follows. More specifically, it is determined whether a print job is identical to a copy job associated with a job ticket transmitted in step S906. For this purpose, an identifier is contained in a job ticket, and the information processing terminal sets the identifier in a print job and issues the print job. If it is determined that the print job is identical to the copy job, the print job is executed to generate 1-page image data for a sheet serving as a print medium in accordance with print setting information. The 1-page image data is copied as 1-page image data read by the copy read control unit 108 in a local copying operation. In other words, a process which implements a local copying function among selected copying functions is executed for 1-page image data generated on the basis of the print job, and then a printing process is performed. If the local copying function is a function (e.g., layout function) which targets a plurality of pages, a process to implement the local copying function for a plurality of pages generated on the basis of the print job is executed.

In this manner, execution entities for the local copying function and PC-assisted function are separated. Even if a selected local copying function is not provided by the printer driver, the function can be completely implemented.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-148556 filed on May 20, 2005, which is hereby incorporated by reference herein in its entirely.

The invention claimed is:

1. An image forming apparatus comprising:
a reading unit configured to read an image;
one or more processors; and
one or more memories storing instructions that, when executed by the one or more processors, cause the image forming apparatus to function as:
(1) a display control unit configured to display a selection screen for selecting one from among processes including at least first processing and second processing as processing for image data obtained by reading an image by the reading unit, wherein the first processing is processing executable by the image forming apparatus for image data obtained by reading an image by the reading unit, and the second processing is processing executable by an external device for image data obtained by reading an image by the reading unit;
(2) a creation unit configured to create image data processed by the first processing from the image data obtained by reading an image by the reading unit, if the first processing is selected via the selection screen as the processing for the image data obtained by reading an image by the reading unit;
(3) a transmission unit configured to transmit the image data obtained by reading an image by the reading unit to the external device, if the second processing is selected via the selection screen as the processing for the image data obtained by reading an image by the reading unit; and
(4) a reception unit configured to receive, from the external device to which the image data was transmitted by the transmission unit, image data processed by the second processing from the image data obtained by reading an image by the reading unit that was transmitted to the external device by the transmission unit.

2. The image forming apparatus according to claim 1, wherein the transmission unit is configured to transmit (1) the image data obtained by reading an image by the reading unit together with (2) an instruction to execute the second processing.

3. The image forming apparatus according to claim 1, further comprising a print unit configured to print, on a print medium, the image data created by the creation unit.

4. The image forming apparatus according to claim 3, wherein the print unit is configured to print the image data that was processed by the second processing by the external device from the image data obtained by reading an image by the reading unit and received by the reception unit.

5. The image forming apparatus according to claim 1, further comprising a determination unit configured to determine whether or not the external device is connected to the image forming apparatus,
wherein the display control unit is configured to display both the first processing and the second processing as choices in the selection screen when it is determined that the external device is connected, and the display control unit is configured not to display the second processing but to display the first processing as a choice in the selection screen when it is determined that the external device is not connected.

6. An image forming method performed by an image forming apparatus, the method comprising:
reading an image;
displaying a selection screen for selecting one from among processes including at least first processing and second processing as processing for image data obtained by reading an image, wherein the first processing is processing executable by the image forming apparatus for image data obtained by reading an image, and the second processing is processing executable by an external device for image data obtained by reading an image;
creating image data processed by the first processing from the image data obtained by reading an image, if the first processing is selected via the selection screen as the processing for the image data obtained by reading an image;
transmitting the image data obtained by reading an image to the external device, if the second processing is selected via the selection screen as the processing for the image data obtained by reading an image; and
receiving, from the external device to which the image data was transmitted in the transmitting, image data processed by the second processing from the image data obtained by reading an image that was transmitted to the external device in the transmitting.

7. The image forming method according to claim 6, wherein in the transmitting, the image data obtained by reading an image is transmitted together with an instruction to execute the second processing.

8. The image forming method according to claim 6, further comprising printing, on a print medium, the image data created in the creating.

9. The image forming method according to claim 8, wherein the image data that was processed by the second processing by the external device from the image data obtained by reading an image and received in the receiving is printed in the printing.

10. The image forming method according to claim 6, further comprising determining whether or not the external device is connected to the image forming apparatus,
wherein both the first processing and the second processing is displayed in the displaying as choices in the selection screen when it is determined that the external device is connected, and the second processing is not displayed but the first processing is displayed as a choice in the selection screen when it is determined that the external device is not connected.

11. A non-transitory computer-readable medium storing a program therein for causing an image forming apparatus to execute an image forming method, the method comprising:
reading an image;
displaying a selection screen for selecting one from among processes including at least first processing and second processing as processing for image data obtained by reading an image, wherein the first processing is processing executable by the image forming apparatus for image data obtained by reading an image, and the second processing is processing executable by an external device for image data obtained by reading an image;
creating image data processed by the first processing from the image data obtained by reading an image, if the first processing is selected via the selection screen as the processing for the image data obtained by reading an image;
transmitting the image data obtained by reading an image to the external device, if the second processing is selected via the selection screen as the processing for the image data obtained by reading an image; and
receiving, from the external device to which the image data was transmitted in the transmitting, image data processed by the second processing from the image data obtained by reading an image that was transmitted to the external device in the transmitting.

12. The non-transitory computer-readable medium according to claim 11, wherein in the transmitting, the image data obtained by reading an image is transmitted together with an instruction to execute the second processing.

13. The non-transitory computer-readable medium according to claim 11, wherein the method further comprises printing, on a print medium, the image data created in the creating.

14. The non-transitory computer-readable medium according to claim 13, wherein the image data that was processed by the second processing by the external device from the image data obtained by reading an image and received in the receiving is printed in the printing.

15. The non-transitory computer-readable medium according to claim 11, wherein the method further comprises determining whether or not the external device is connected to the image forming apparatus, and wherein both the first processing and the second processing is displayed in the displaying as choices in the selection screen when it is determined that the external device is connected, and the second processing is not displayed but the first processing is displayed as a choice in the selection screen when it is determined that the external device is not connected.

* * * * *